Aug. 20, 1968  D. S. WEBSTER  3,397,869
HYDROFOIL AGITATOR BLADE
Filed May 3, 1967
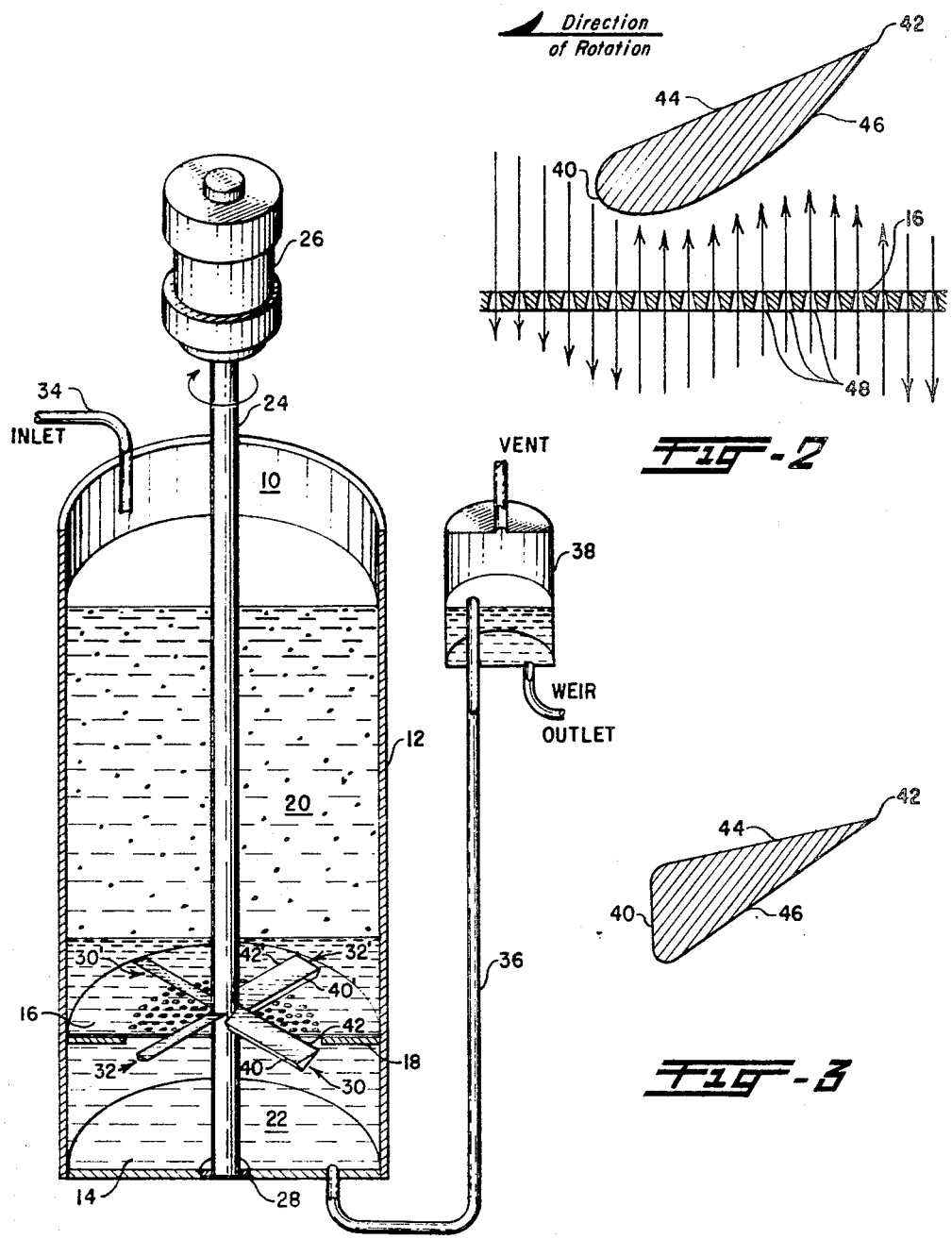
INVENTOR.
Donald S. Webster
BY United States Patent Office 3,397,869
Patented Aug. 20, 1968

3,397,869
HYDROFOIL AGITATOR BLADE
Donald S. Webster, Aiken, S.C., assignor to the United States of America as represented by the United States Atomic Energy Commission
Filed May 3, 1967, Ser. No. 637,041
9 Claims. (Cl. 259—108)

ABSTRACT OF THE DISCLOSURE

A rotary agitator apparatus, including a cylindrical vessel with a sceen or perforated plate positioned near its bottom for supporting a solid-liquid mixture, such as an ion exchange resin bed, and mechanically driven radial blades spaced above the plate for stirring the mixture. The agitator blades are hydrofoils that are positioned and rotated so as to momentarily reduce the pressure of the mixture beneath the blades. By reducing the pressure beneath the blades there is a momentary reversal of net downward flow and fines, that may tend to plug the perforated plate, are maintained in suspension.

Background of the invention

The invention described herein was made in the course of, or under a contract with the U.S. Atomic Energy Commission.

Field of the invention

The invention relates generally to a rotary agitator apparatus and more particularly to an improved agitator blade for stirring particulate solid-liquid mixtures which may contain fines in a rotary agitator apparatus.

Description of the prior art

A rotary agitator apparatus using flat paddles or scrapers, positioned near the bottom of a vessel, is often used for stirring or agitating mixtures of solid particles and liquids. Agitation or stirring of this type is used to fluidize the mixture, i.e., to maintain fine solids in suspension, to provide intimate contact between the liquid and the solids, and/or to provide a flow of liquid through a solid particle media. For example, a rotary agitator is sometimes used to fluidize an ion exchange resin bed while liquid solutions, either feed or elutriant, contact and pass through the bed. Although overflow type beds are also used, the most common arrangement provides a screen or perforated plate near the bottom of the vessel, to support the resin bed and an agitator blade disposed above the screen. [See U.S. Patent 2,786,831, issued to Bartels, C. R. et al. and Bartels, C. R. "A Novel Ion-Exchange Method for the Isolation of Streptomycin," Chem. Eng. Progress 54, No. 8, 49–51 (1958).] Another application of a rotary agitator is in a device for contacting a liquid with a bed of solid particulate catalytic material.

A principal difficulty encountered in these apparatus is that when finely divided solids are present in the liquid solutions, fines accumulate in the bed, settle on the screen and eventually plug the bed and/or "blind" the bed supporting screen. This "blinding" occurs in spite of agitation with conventional paddle-type agitator blades. "Blinding" of the screen is particularly a problem when the screen is not level and there is an appreciable clearance between the bottom of the agitator blade and parts of the screen. On the other hand, if the blade is placed in contact with or very close to the screen, or is rotated rapidly in an attempt to "unblind" the screen, damage to the resin and screen often results.

Some of these problems can be alleviated by inserting a filter in the liquid stream ahead of the bed. However, under certain conditions, such as in the processing of radioactive solutions, a filter is impractical because of the difficulty and hazard involved in cleaning or replacing the filter medium. Fines are also formed by attrition of the solid particles; in this case, the filter does not help remove the fines.

Summary of the invention

In accordance with the present invention, it has been found that the above-described difficulty is substantially eliminated by providing an improved agitator blade in the shape of a hydrofoil that is positioned and rotated so that there is a decrease in pressure of the particulate solid-liquid mixture beneath the blade. As the hydrofoil agitator blade is rotated above a screen or perforated plate, the decrease in pressure is sufficient to momentarily reverse the flow of liquid through the portion of the plate directly below the blade, thereby unplugging or unblinding the perforated plate. In the case of an overflow agitator apparatus (without a screen), the decrease in pressure below the hydrofoil will increase turbulence at lower agitator speeds and prevent silting or the accumulation of fines in the bottom of the apparatus and more readily maintain the fines fluidized. As an added advantage, spacing between the perforated plate and the hydrofoil blade becomes less critical. For the purposes of this specification, the term "perforated plate" is intended to include any suitable sieve, such as a screen or plate, having openings for the passage of liquid and particles smaller than the sieve size selected.

Accordingly, it is an object of the present invention to provide an improved rotary agitator blade. It is another object to provide an improved rotary agitator blade for the continuous agitation of particulate solid-liquid mixtures. It is still another object to provide a means to prevent the plugging or blinding of ion exchange resin beds by finely divided solids.

These and other objects and advantages of the present invention will appear from the following detailed description of a preferred embodiment taken in conjunction with the following appended drawings, in which like reference characters designate like parts throughout the several figures.

Brief description of the drawings

FIG. 1 shows a sectional view, in perspective, of a rotary agitator apparatus incorporating the improved agitator blades of the present invention for agitating a downflow ion exchange resin bed.

FIG. 2 shows a cross section of one embodiment of the improved agitator blade of FIG. 1 showing the hydrofoil cross section, a preferred perforated plate with tapered openings, and an illustrative liquid flow pattern beneath the blade.

FIG. 3 shows a cross section of another embodiment of the improved agitator blade of FIG. 1 showing an alternative wedge-shaped cross section.

Description of the preferred embodiment

The improved agitator blades of the present invention are shown in FIG. 1 incorporated in a rotary agitator apparatus comprising a generally vertical cylindrical vessel 10, having cylindrical side walls 12, a bottom plate 14 and being divided into two sections by a perforated plate 16. The perforated plate 16, which is supported by an interior annular ring 18 disposed near the bottom of the vessel 10, supports a bed 20 generally consisting of a mixture of solid particles and a liquid in the upper section of the vessel 10, and provides separation between the bed 20 and the liquid which passes through the perforated plate 16 into the lower liquid section 22 of vessel 10. A particularly suitable perforated plate 16 is the type having tapered openings as illustrated hereinafter in FIG. 2.

Liquid inlet is provided through an inlet conduit 34 directed into the top of the vessel 10 and a liquid outlet is provided by an outlet conduit 36 attached to the bottom plate 14. The outlet conduit 36 is preferably connected to an overflow weir 38 that, in addition to providing a liquid outlet means, also continuously maintains the desired liquid level in the vessel 10.

A rotatable shaft 24, depending from an external mechanical drive means 26, extends approximately coaxially into vessel 10 through an opening in perforated plate 16 to the bottom plate 14. A bearing 28, that is mounted in bottom plate 14, supports the lower end of shaft 24. Agitator blades 30, 32, to be described in more detail hereinafter, are rigidly mounted about the shaft 24 and are in adjacent spaced relationship for rotation above the perforated plate 16.

The agitator blades 30, 32 comprise preferably either 2 or 4 elongated hydrofoils, radially extending and equally spaced about the shaft 24, having a relatively broad leading edge 40 and a relatively narrow trailing edge 42. For the purposes of this specification, a blade having a broad or blunt leading edge and a narrow trailing edge will be referred to as a "hydrofoil" regardless of the cross-sectional configuration. Although the exact shape of hydrofoil blades is not critical, particularly good results have been obtained using the shapes illustrated in FIGS. 2 and 3.

FIG. 2 shows an agitator blade, in cross section, which may be described as an "arcuate-shaped" hydrofoil having a flat upper face 44, a blunt, arcuate leading edge 40 and an arcuate lower face 46. The blunt leading edge 40 has a substantially shorter radius of curvature than the arcuate lower face 46 so that the hydrofoil effect is achieved by the convergence of the upper face 44 and the lower face 46 at the trailing edge 42. The exact cross-sectional configuration of the lower face and the leading edge, and the amount of the upward inclination of the upper face, depend upon the physical characteristics of the solid particle-liquid mixture. However, using an arcuate-shaped hydrofoil to stir an ion exchange resin bed, a suitable angle of upward inclination of the upper face 44 is between about 10° and 20° from a horizontal plane, such as the plane of the resin bed retaining perforated plate 16. Exemplary blade dimensions will be given herein below.

FIG. 2 also shows a preferred perforated plate 16 for the rotary agitator apparatus of FIG. 1 having tapered holes or openings 48 with the narrowest cross-sections of the openings facing the agitator blade, i.e. opposite the direction of liquid flow. This use of tapered openings minimizes the well known tendency of particles or resin beads to become embedded in the plate. The liquid flow pattern beneath the blades, also illustrated by FIG. 2, is described below.

Similarly, the hydrofoil of FIG. 3, also shown in cross section, has a leading edge 40, a narrow trailing edge 42 and a flat upper face 44. The leading edge 40 and the lower face 46, however, instead of being arcuate-shaped are both flat to give a wedge-shaped cross-sectional configuration. Using this wedge-shaped hydrofoil, the leading edge is approximately perpendicular to the perforated plate 16 and both the upward and lower faces are inclined upward from the plane of the plate. For the upper face an angle of between 10° and 20° and for the lower face an angle from between about 30° and 40° have proved suitable, particularly for stirring an ion exchange resin bed.

Although the exact dimensions of the present rotary agitator apparatus and the improved agitator blades are not critical, exemplary dimensions for an apparatus for containing and agitating an ion exchange resin bed, such as that shown in FIG. 1, may be useful for a more thorough understanding of the invention. A vessel about 12 inches in diameter and about 24 inches high will accommodate a resin bed of approximately 25 liters for either loading or elution. The perforated plate 16, mounted about 3 to 4 inches above the bottom plate 14, has about 7% sieve openings equivalent in size to about 100 mesh (U.S. Sieve Series). Each hydrofoil blade is about 4 inches long and with a shaft about 1 inch in diameter give an overall blade sweep diameter of about 9 inches. The arcuate shaped hydrofoil blade of FIG. 2 is about 5/8 inch thick, about 2 inches wide from the leading edge to the trailing edge, and the upper face is positioned at an upward angle of inclination of about 17½°. The wedge-shaped hydrofoil blade of FIG. 3 is about 3/4 inch thick at the flat leading edge and the upper face is inclined upward at an angle of about 12½° and the lower face is inclined upward at at an angle of about 32½°.

The effect of the hydrofoil blade is to provide a rotating region of decreased pressure in the mixture directly below the blade. The decrease in pressure is sufficient to cause a momentary reversal of flow of the liquid through the portion of the perforated plate directly below the blade, as the blade rotates. This effect prevents plugging of the bed and blinding of the perforated plate. The exact liquid flow pattern has not been determined, but the flow pattern that results from the passage of the rotating hydrofoil blade is schematically illustrated by arrows in FIG. 2. The gross liquid flow ahead of the leading edge 40 is downward through the openings 48 while, as the blade passes, there is a momentary reversal of flow directly beneath the blade. After the blade has passed, the liquid flow reverts to the normal downflow behind the trailing edge 42. As a resulting advantage, the spacing of the blade above the perforated plate is less critical, so that it is possible to increase the spacing from about 1/8 inch to about 3/8 inch without blinding the perforated plate. For the same blade spacing, it has been found that a higher liquid flow rate is possible even with a higher concentration of fines in the liquid.

Although this invention is described in detail with reference to its preferred embodiment, it is contemplated that obvious modifications will occur to those skilled in the art and that such may be made without departing from the scope of this invention, which is limited only as indicated by the appended claims.

What is claimed is:

1. In a rotary agitator apparatus comprising a vessel for containing a solids-liquid mixture, a perforated plate disposed near the bottom of said vessel, and a mechanically driven radial blade in adjacent spaced relationship above said plate for stirring said mixture, the improvement wherein said blade is a hydrofoil having a broad leading edge and a narrow trailing edge, said trailing edge being inclined upward from a horizontal plane, and said hydrofoil being disposed for rotation in a direction that will reduce the pressure of the mixture beneath said blade to substantially reduce the plugging of said perforated plate by solids in said mixture.

2. The improvement of claim 1 wherein a plurality of said hydrofoils are radially disposed for rotation above said plate.

3. The improvement of claim 1 wherein said hydrofoil has a wedge-shaped cross section, the leading edge of which is approximately perpendicular to the plane of said plate.

4. The improvement of claim 3 wherein the upper face of said hydrofoil is inclined upward from the plane of said plate at angle of between about 10° and about 20° and the lower face is inclined upward from the plane of said plate at an angle of between about 30° and about 40°.

5. The improvement of claim 1 wherein the leading edge and lower face of said hydrofoil is arcuate-shaped and the upper face is flat.

6. The improvement of claim 5 wherein the upper face of said hydrofoil is inclined upward from the plane of said plate at an angle of between about 10° and about 20°.

7. The improvement of claim 1 wherein said trailing edge of said hydrofoil is inclined upward from a horizontal plane at an angle sufficient to significantly reduce the pressure of said mixture directly below said hydrofoil.

8. An agitator blade for agitating a particulate solid-liquid mixture that is supported by a perforated plate and disposed within a rotary agitator apparatus, said blade comprising a hydrofoil having a broad leading edge and a narrow trailing edge and being disposed in spaced relationship above said plate, said trailing edge being inclined upward at an angle sufficient to significantly reduce the liquid pressure on said perforated plate directly below said hydrofoil.

9. The improvement of claim 1 wherein said perforated plate has tapered openings, the narrow portion of said openings being on the side of said plate adjacent said hydrofoil blade.

References Cited

UNITED STATES PATENTS

| | | | |
|---|---|---|---|
| 79,739 | 7/1868 | Dow | 259—135 |
| 132,483 | 10/1872 | Muth | 259—134 |
| 733,161 | 7/1903 | Comegys | 259—134 X |
| 749,087 | 1/1904 | Neubert | 259—8 X |
| 850,931 | 4/1907 | Hoffman | 259—135 X |

ROBERT W. JENKINS, *Primary Examiner.*